3,446,569
AQUEOUS SOLUTIONS OF PHTHALOCYANINE PIGMENTS AND PROCESS FOR PREPARING THEM
Oskar Braun, Frankfurt am Main, Richard Gross, Offenbach (Main), and Herbert Nakaten, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed May 5, 1964, Ser. No. 365,156
Claims priority, application Germany, May 11, 1963,
F 39,722
Int. Cl. D06p 1/68
U.S. Cl. 8—84   8 Claims

ABSTRACT OF THE DISCLOSURE

A stable, aqueous alkaline solution containing a water-insoluble phthalocyanine pigment, such as a copper phthalocyanine-trisulfonic acid anilide ($CuPc(SO_2NHPh)_3$), a quaternary cationic surface-active compound such as

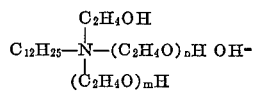

in which the sum of $m$ and $n$ is 9 and, optionally, a strong base such as sodium hydroxide and/or a water soluble organic solvent, such as alkanols, glycols, dimethyl formamide, phosphoric acid tris-dimethylamide, acetone or dimethyl sulfoxide. This is useful for dyeing and printing textile material by contact therewith, followed by treatment with an aqueous acid bath.

---

It is known that phthalocyanine pigments can be rendered water-soluble by introducing, for instance, sulfuric acid groups. The solutions prepared therewith may be used for dyeing and printing textiles. The dyeings possess, however, only poor fastness to wetting.

Now we have found that industrially appreciated stable aqueous solutions of phthalocyanine pigments containing a plurality of sulfonic acid arylamide- or sulfonic acid alkylamide groups can be prepared by dissolving the pigments with the aid of a cationic surface-active compound and, if desired, an agent showing a strong basic action and, if desired, an organic solvent.

For the preparation of the aqueous solutions with the aid of the surface-active cationic auxiliary agent and, if desired, of the strong base and an organic solvent it will be advantageous to prepare at first a concentrated solution of the pigment. When operating in this manner, the pigment is dissolved, if possible, at room temperature, sometimes likewise at an elevated temperature up to about 100° C., in most cases up to about 80° C. in the cationic auxiliary agent, or in a preferably concentrated aqueous solution of about 40% to 70% strength of the cationic auxiliary agent. The quantity in which the surface-active auxiliary agent is required for this purpose generally amounts to 3 to 40 times, preferably 3 to 10 times the amount by weight of the pigment used. In practice, it will be endeavoured to keep the concentration of auxiliary agent as low as possible. In some cases, for instance if very difficultly soluble pigment are concerned, or, in particular, if the cationic surface active auxiliary agent is not alkaline enough, it may be suitable to take for the preparation of the concentrated pigment solution an agent showing a strong basic action and, if desired, an organic solvent. When operating in this manner, a strong base and, if desired, an appropriate organic solvent are added in an amount sufficient to yield a clear pigment solution. The amount of the strong base to be added, if desired, is so adjusted that a pH-value of at least 12 is attained. For economical reasons, the amount of the organic solvent to be added, if desired, should be as small as possible. Generally, up to about 10 parts by weight of the organic solvent are sufficient for 1 part by weight of pigment.

In some cases, especially if dyestuffs very sparingly soluble or difficultly maintainable in solution are concerned, it may be suitable to add to the pigment solutions, in order to stabilize them, a polyalkylene-glycol of high molecular weight, especially a polyethylene-glycol having a molecular weight of about 150 to 5000. Instead of the polyalkylene-glycols or in conjunction therewith other non-ionic products may likewise be used, for instance, addition products of ethylene-oxide to compounds containing hydroxyl- or amino-groups, as, for instance, alcohols, fatty acids, alkyl-phenols, amines and the like.

The concentrated pigment solution can be diluted with water which may contain an alkali to such an extent that the desired concentration is attained. If, on dilution with water or on storing the finished pigment solutions which were prepared with insufficient amounts of cationic agents, turbidities should occur, these can easily be dissolved generally by a further addition of a cationic surface-active substance.

As surface-active agents to be used according to the invention, all cationic auxiliary agents may be used in which the cation constitutes the greater part of the molecule. As appropriate cationic surface-active compounds there enter into consideration, above all, the quaternization products derived from fat amines; as fat amines being understood aliphatic amines with an alkyl radical containing about 8–22 carbon atoms. The ammonium bases or likewise their salts with inorganic or organic acids can be used, such, for instance, as hydrohalic acids, acetic acid, sulfuric acid, lactic acid, formic acid, citric acid, tartaric acid, from which the corresponding bases are formed by addition of alkalies. Preferably, the ammonium bases are directly used. A mixture of the various cationic auxiliary agents of the above-mentioned type can likewise be used. There enter into consideration quaternary ammonium compounds of the general formula

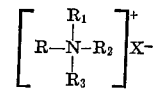

wherein R represents a high-molecular organic radical with at least 8 carbon atoms, $R_1$, $R_2$ and $R_3$ are alkyl-, aralkyl- or aryl radicals which may be substituted or, together with the nitrogen atom, may form a heterocyclic ring, and X represents an anion.

R may be an aliphatic straight-chained or branched hydrocarbon radical with 8–22 carbon atoms which in the chain may contain one or several double linkages, hetero atoms such, for example, as oxygen or—if desired—quaternized nitrogen atoms, or functional groups, such, for instance, as carboxylic acid groups. Furthermore, R may be an aromatic, hydroaromatic or cyclo-aliphatic radical which may carry aliphatic side chains. The alkyl-, aralkyl- or aryl radicals $R_1$, $R_2$ and $R_3$ may be equal or different and may contain substituents such, for example, as halogen atoms, hydroxy-alkyl- or polyalkyleneglycol ether groups. Together with the nitrogen atom they may likewise form a heterocyclic ring, for instance, a pyridine or morpholine ring. The anion X may represent the hydroxy group or likewise the rest of an inorganic or organic acid; it may, for instance, represent the rest of a hydrohalic acid such as hydrochloric or hydrobromic acid, or of another inorganic acid, for instance, sulfuric acid or phosphoric acid, or the rest of an organic carboxylic acid, for instance, acetic acid, formic acid, oxalic acid, lactic acid, tartaric acid, gluconic acid, citric acid or benzoic acid, or the rest of an organic sulfonic acid, for instance, methane-sulfonic acid or benzene-sulfonic acid.

Suitable quaternary ammonium compounds are, for instance:

dodecyl-dimethyl-benzyl-ammonium chloride,
oleyl-trimethyl-ammonium chloride,
distearyl-dimethyl-ammonium chloride,
lauryl-dimethyl-hydroxy-ethyl-ammonium chloride,
dodecyl-di-(hydroxyethyl)-methyl-ammonium chloride,
dodecyl-dimethyl-vinyl-ammonium chloride,
dodecyl-di-[(hydroxy-diethoxy)-ethyl]-benzyl-ammonium chloride,
nonylphenyl-dimethyl-benzyl-ammonium chloride,
oleyl-di-(hydroxy-ethyl)-ethylene-glycol ether-ammonium chloride,
oleyl-dimethyl-hydroxy-ethyl-ammonium chloride,
coconut-oil-alkyl-di-(triethylene-glycol ether)-benzyl-ammonium chloride,
coconut-oil-alkyl-dimethyl-benzyl-ammonium chloride,
coconut oil-alkyl-dimethyl-γ-hydroxy-propyl-ammonium chloride,
distearyl-dimethyl-ammonium chloride,
trioctyl-methyl-ammonium chloride,
coconut oil-alkyl-dimethyl-ω-hydroxypropyl-ammonium chloride and compounds of the formulae

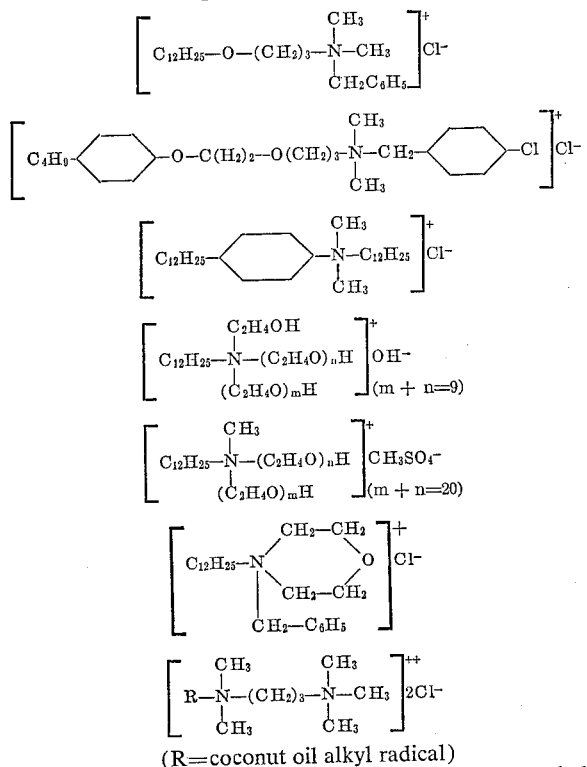

(R=coconut oil alkyl radical)

Often the cationic compounds such as dodecyl-methyl-morpholinium-chloride, lauryl-pyridinium chloride, hexadecyl - N,N' - dimethyl-benzimidazolinium-sulfate derived from heterocyclic nitrogen-containing bases such as pyridine or morpholine, proved suitable.

As cationic surface-active compounds there can further be used quaternary phosphonium compounds of the general formula

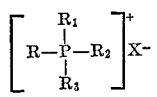

in which R, $R_1$, $R_2$ and $R_3$ as well as X have the meaning given above.

Appropriate quaternary phosphonium compounds are, for instance:

dodecyl-dimethyl-benzyl-phosphonium chloride,
dodecyl-trimethyl-phosphonium chloride,
dodecyl-dimethyl-hydroxyethyl-phosphonium chloride,
coconut oil-alkyl-dimethyl-benzyl-phosphonium chloride,
oleyl-dimethyl-benzyl-phosphonium chloride.

As organic solvents to be simultaneously used, if desired, practically all non-acid, inert, water-soluble organic solvents or mixtures of solvents may be used. First of all, alcohols, ethers, acid amides, ketones and esters, such, for example, alkanols such as ethanol, butanol, glycols such as ethyl-diglycol, ethyl-thiodiglycol and polyalkylene-glycols, especially polyethylene-glycols with molar weights up to about 5000, dimethy-foramamide, phosphoric acid tris-dimethylamide and acetone, furthermore likewise di-methyl-sulfoxide, enter into consideration.

As agents showing a strong basic action which may be simultaneously used there are mentioned strong organic or inorganic bases, preferably alkali metal hydroxides or ammonia.

As phthalocyanine pigments there enter into consideration water-insoluble phthalocyanine dyestuffs containing a plurality of preferably 2 to 4 sulfonic acid arylamide or sulfonic acid alkylamide groups. These dyestuffs can be prepared, for example, according to the process of German Patent 696,591 by reaction of metal-containing phthalocyanine-sulfonic acid chlorides with aromatic amines such, for example, as aniline, toluidines, xylidines, ethyl-anilines, anisidines, phenetidines or naphthylamines which may contain further substituents not causing solubility in water, such as halogen atoms, nitro-, trifluoromethyl-, cyano-, acyl-, carboxylic acid ester- and carboxylic acid amide groups, or with aliphatic amines, such, for example, as methylamine, propylamine, butylamine or benzylamine.

The stable, aqueous solutions of phthalocyanine pigment obtained according to the invention are of particular technical importance. They can be used for the preparation of dyeings resistant to wetting, pad-dyeings or prints on fibrous materials and foils. For the pad-dyeing and printing, solutions are generally used which contain about 1 to 40 grams, preferably 5 to 30 grams of pigment per kilogram of padding liquor or printing paste respectively. For economical reasons, it is advisable to maintain the water portion of the solutions as high as possible, preferably above 250 grams/kilogram and to try to manage with the lowest possible amounts of cationic auxiliary agents and organic solvents. In most cases, it is possible to maintain the water portion of the final pigment solutions in the range between about 400 and 850 g./kg. of solution.

The pad-dyeing or printing with the use of the aqueous pigment solutions according to the invention is very simple. The fibrous material to be dyed is preferably padded or printed at room temperature with the pigment solution, then suitably dried and, for development, treated with an acid bath, preferably at room temperature. The pH-value of this acid aqueous developing bath may vary within wide limits. Generally, pH-values within a range of about pH 1 to pH 5, preferably pH 1 to pH 3, are maintained. The development of the dyeing occurs the more rapidly, the lower the pH-value of the developing bath is chosen. In order to adjust the acid pH-value, any desired organic or inorganic acids may be used, such, for example, as formic, acetic acid, propionic acid, hydrochloric acid or sulfuric acid. Furthermore, it is likewise possible to develop the dyeing by making use of the atmospheric carbon-dioxide and hanging the padded, printed and dried goods for a prolonged period in the air. After the development, the goods are rinsed, soaped, again rinsed and dried as usual.

When using the stable, aqueous pigment solutions according to the invention in textile printing, thickening agents are used which show a good compatibility with alkalies and cationic compounds. On appropriate selection of acid resist agents, white and colored preprint resists of the pad-dyeings prepared with the pigment solutions according to the invention can be prepared.

For dyeing in a long bath, the pigment concentration is adjusted according to the goods-to-liquor ratio; in most cases, concentrations in the range between 0, 2 and 5 g./l., are used. The dyeing from a long bath is carried out in the usual manner in the boiling bath. The goods are then rinsed and—as indicated for the pad dyeing—developed by treatment in an acid bath, and, if desired, soaped.

As fibrous materials to be dyed or printed, leather and textile materials such as fibers, yarns, tissues, hosiery goods, knit goods and fiber fleeces of natural or synthetic material, such, for example, as fibrous materials of native or regenerated cellulose, cellulose esters, wool, silk, superpolyamides, poly-acrylonitrile, polyvinyl-chloride or linear polyesters such as polyethylene-glycol-terephthalate, are used. The aqueous pigment solutions are preferably used for the dyeing of fibrous material, other ing cellulose. On dyeing synthetic fibrous material, other auxiliary agents, for instance so-called carriers, or compounds splitting off acids may be added to the dyestuff solutions or preparations. When dyeing synthetic fibrous material it may sometimes be of advantage to keep the water content of the azo-dyestuff solutions according to the invention low in favor of the portion of cationic auxiliary agent and organic solvent. When operating in this manner, it may in some cases be advantageous to use solutions with a water content of about 100 to 400 g./kg. of solution.

In the following examples the parts as far as they are not designated otherwise, are parts by weight and the precent indications are percent by weight.

Example 1

20 g. of copper-phthalocyanine-trisulfonic acid anilide are dissolved at 70° C. in a mixture of 60 cc. of aqueous sodium hydroxide solution at 32.5% strength, 200 cc. of water, 100 g. of polyethylene-glycol of an average molecular weight of 1000 and 100 g. of the compound of the formula

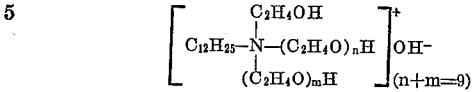

For a pad-dyeing, the solution is diluted with water to 1 liter. With this solution a cotton fabric, for instance, can be padded. After the padding, the fabric is dried at about 80° C., subsequently acidified with 20 cc. of concentrated sulfuric acid in a liter of water, rinsed and after-treated for 10 minutes at 95° C. with 3 g. of soap and 1 g. of calcined soda per liter of water, rinsed and dried. A greenish blue dyeing is obtained showing very good fastness to wetting.

For dyeing a viscose spinning mass, 40 cc. of the concentrated pigment solution are stirred into 1000 g. of viscose, corresponding to 90 g. of cellulose. The dyed viscose is then spun in the usual manner on a spinning machine. A transparent greenish blue thread is obtained. A rise of pressure at the spinning nozzle does not occur.

In the same manner a solution of copper-phthalo-cyanine-trisulfonic acid butyl-amide can likewise be prepared. The solution can also be used for the spin-dyeing of viscose and, after dilution, as padding liquor. The pigment solutions can likewise be used for printing. To this end, the concentrated solution is stirred into 500 grams of a carboxymethyl-cellulose thickener of 4% strength containing 50 cc. of aqueous sodium hydroxide solution of 32.5% strength and extended to 1 kg. with further thickening. With the printing paste a cotton fabric is printed, dried and finished as described above.

Example 2

20 g. of copper phthalocyanine trisulfonic acid anilide are dissolved at 50° C. in a mixture of 60 cc. of aqueous sodium hydroxide solution of 32.5% strength, 100 cc. of diethyleneglycol monoethyl ether, 150 cc. of water, 75 g. of polyethylene-glycol of an average molecular weight of 1000 and 75 g. of the compound

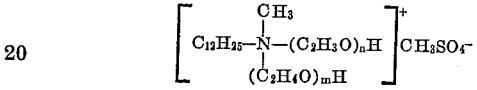

The solution can be used in the same manner as that obtained according to Example 1 for padding and printing.

Example 3

20 g. of copper-phthalocyanine-trisulfonic acid anilide are dissolved in a mixture of 60 cc. of aqueous sodium hydroxide solution of 32.5% strength, 100 cc. of water and 300 g. of the compound of the formula

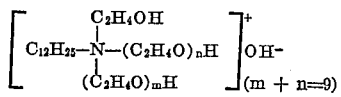

The solution can be used in the same manner as indicated in Example 1 for padding and printing. It is likewise very well appropriate for spin-dyeing. To this end, 50 cc. of the concentrated pigment solution are stirred into 1000 g. of viscose, corresponding to 90 g. of cellulose, The dyed viscose is then spun on a spinning machine in the usual manner A transparent, greenish blue thread is obtained. A rise of pressure at the spinning nozzle does not occur.

Example 4

20 g. of the phthalocyanine pigment mentioned in Example 1 are dissolved at 80° C. in a mixture of 60 cc. of and aqueous sodium hydroxide solution of 32.5% strength, 150 cc. of water, 150 cc. of diethylene-glycol monoethyl ether and 150 g. of the compound of the formula

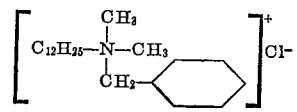

Example 5

A clear, aqueous solution of the phthalocyanine pigment mentioned in Example 1 is obtained by dissolving at 50° C. 20 g. of the pigment in a mixture of 60 cc. of aqueous sodium hydroxide solution of 32.5% strength, 100 cc. of diethylaminoethanol, 150 cc. of water, 75 g. of a polyethylene glycol of an average molecular weight of 1000 and 75 g. of the compound of the formula

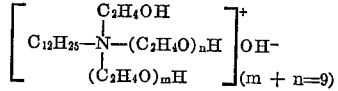

A likewise clear solution of the pigment is obtained if for the dissolution a mixture of 60 cc. of an aqueous sodium hydroxide solution of 32.5% strength, 100 cc. of diethylene-glycol-monoethyl ether and 150 g. of the compound of the formula

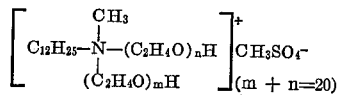

is used.

The solutions may be used in the same manner as those of Example 1 for padding and printing.

Example 6

From 1 g. of copper phthalocyanine-trisulfonic acid anilide and a mixture of 5 g. of a polyglycol of an average molecular weight of 1000, 10 cc. of water, 0.75 cc. of an aqueous sodium hydroxide solution of 32% strength and 5 g. of the compound of the formula

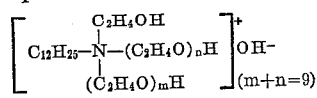

a clear solution is formed.

For the dyeing in a long bath the concentrated solution of the pigment can be stirred into 1 l. of water of 50° C. 50 g. of a cotton yarn are introduced into the dyebath thus obtained and the temperature is raised to 98–100° C. Dyeing is carried out for about 1 hour at this temperature. The yarn is then rinsed, centrifuged and aftertreated for 15 minutes at 60° C. with an aqueous bath containing per liter 1 g. of soda and 1 g. of an addition compound of 10 mols of ethylene-oxide to 1 mol of nonyl-phenol. A greenish blue tint showing high fastness properties is obtained.

In the same manner a polyamide yarn can likewise be dyed.

We claim:

1. A stable aqueous alkaline solution for textile dyeing and printing, said solution comprising
    (a) a phthalocyanine pigment having a plurality of at least two sulfonic acid aryl hydrocarbon amide groups and no reactive groups or groups causing solubility in water, and
    (b) between about 3 and 40 parts by weight of a quaternary cationic surface-active compound per part by weight of pigment.

2. A solution as claimed in claim 1 wherein as further component (c) a strong base is present.

3. A solution as claimed in claim 1 wherein as further component (d) a water-soluble organic solvent is present.

4. A solution as claimed in claim 1 wherein the weight of the quaternary cationic surface-active compound present is 3 to 10 times the weight of phthalocyanine pigment present.

5. A solution as claimed in claim 1 wherein the quaternary cationic compound is a quaternary ammonium base having at least one polyalkylene glycol ether radical containing up to 20 alkylene glycol ether units in the molecule.

6. A process for dyeing and printing textile material which comprises contacting said material with an aqueous solution comprising
    (a) a phthalocyanine pigment having a plurality of at least two sulfonic acid aryl hydrocarbon amide groups and no reactive groups or groups causing solubility in water, and
    (b) between about 3 and 40 parts by weight of a quaternary cationic surface-active compound per part by weight of pigment and then contacting the material with an aqueous acid bath.

7. A process as claimed in claim 6, wherein the aqueous alkaline solution contains as further component (c) a strong base.

8. A process as claimed in claim 6, wherein said aqueous alkaline solution contains as further component (d) a water-soluble organic solvent.

References Cited

UNITED STATES PATENTS

| | | | |
|---|---|---|---|
| 3,053,849 | 9/1962 | Clark et al. | 8—1.3 |
| 3,178,254 | 4/1965 | Hoelzle et al. | 8—84 XR |
| 3,265,461 | 8/1966 | Luetzel et al. | 8—84 |
| 3,307,901 | 3/1967 | Bindler et al. | 8—84 XR |

DONALD LEVY, *Primary Examiner.*

U.S. Cl. X.R.

8—62; 106—308